US005511230A

United States Patent [19]

Ryu

[11] Patent Number: 5,511,230

[45] Date of Patent: Apr. 23, 1996

[54] COMMUNICATION SYSTEM BETWEEN MASTER SYSTEM AND MULTIPLE SLAVE SYSTEMS IN TIME DIVISION MODE WHERE A NEXT SLAVE IS SERVICED UPON RECEIPT OF FINAL ACKNOWLEDGEMENT

[75] Inventor: Sang-Shin Ryu, Seoul, Rep. of Korea

[73] Assignee: SamSung Electronics Co., Ltd., Suwon, Rep. of Korea

[21] Appl. No.: 899,304

[22] Filed: Jun. 16, 1992

[30] Foreign Application Priority Data

Jun. 24, 1991 [KR] Rep. of Korea .................. 1991-10502

[51] Int. Cl.[6] .................................................. G06F 9/00

[52] U.S. Cl. ...................... 395/865; 395/826; 364/230.4; 364/231.4; 364/240.9; 364/DIG. 1

[58] Field of Search .................................... 395/200, 865, 395/826; 340/825, 825.6; 370/24, 29, 32, 58.1, 59, 63, 68

[56] References Cited

U.S. PATENT DOCUMENTS

| | | | |
|---|---|---|---|
| 3,613,092 | 10/1971 | Schuman | 340/518 |
| 4,193,073 | 3/1980 | Kohnen | 395/200 |
| 4,280,217 | 7/1981 | Hatei et al. | 370/63 |
| 4,532,509 | 7/1985 | Pulverenti et al. | 340/825 |
| 4,630,263 | 12/1986 | Townsend et al. | 370/85 |
| 4,658,353 | 4/1987 | Whittaker et al. | 395/200 |
| 5,012,468 | 4/1991 | Siegel et al. | 370/85.5 |
| 5,014,221 | 5/1991 | Mogul | 364/519 |
| 5,136,581 | 8/1992 | Muehrcke | 370/62 |
| 5,163,055 | 11/1992 | Lee et al. | 371/32 |

*Primary Examiner*—Thomas C. Lee
*Assistant Examiner*—Sang Hui Kim
*Attorney, Agent, or Firm*—Robert E. Bushnell

[57] ABSTRACT

A data communication method between a master system and multiple slave systems using a serial input/output interface. The master system connects a communication path to a corresponding slave system, and transmits a message and simultaneously receives a message from the slave system during an assigned communication time. When the transmission of the message ends, the master system transmits a final message and when a final acknowledgement message is received, performs a service for the next slave system. Meanwhile, the slave system receives a message transmitted by the connection of the communication path and simultaneously transmits a message to the master system. Further, when a final message is received, the slave system transmits a final acknowledgement message to the master system. Thus, the effective communication between point-to-multipoint can be achieved.

20 Claims, 7 Drawing Sheets

COMMUNICATION SYSTEM BETWEEN MASTER SYSTEM AND MULTIPLE SLAVE SYSTEMS IN TIME DIVISION MODE WHERE A NEXT SLAVE IS SERVICED UPON RECEIPT OF FINAL ACKNOWLEDGEMENT

BACKGROUND OF THE INVENTION

The present invention relates to a data communication method between a master system and multiple slave systems, and more particularly to a data communication method by means of a serial input/output (SIO) interface and a time division mode.

Generally, in a large exchange system, a few communication processors process a signal transmitted from a plurality of subscriber processors, with the result that a communication of a point-to-multipoint structure is demanded.

SUMMARY OF THE INVENTION

It is an object of the present invention to provide an effective data communication method of point-to-multipoint structure between a master system and multiple slave systems by time division mode.

It is another object of the present invention to provide a data communication method between a master system and multiple slave systems using a SIO interface, in which a communication path composed of SIO interface allows a great deal of messages to be transmitted and received with simple hardware.

In accordance with one aspect of the present invention, the master system connects a communication path to a corresponding slave system, and transmits a message and simultaneously receives a message from the slave system during an assigned communication time. Moreover, when the transmission of the message ends, the master system transmits a final message and when a final acknowledgement message is received, performs a service for the next slave system. Meanwhile, the slave system receives a message transmitted by the connection of the communication path and simultaneously transmits a message to the master system. Further, when a final message is received, the slave system transmits a final acknowledgement message to the master system.

BRIEF DESCRIPTION OF THE DRAWINGS

The objects and other objects of the present invention will be more apparent from the detailed description with reference to the attached drawings, in which.

DETAILED DESCRIPTION OF THE PREFERRED EMBODIMENT

Figure 1:
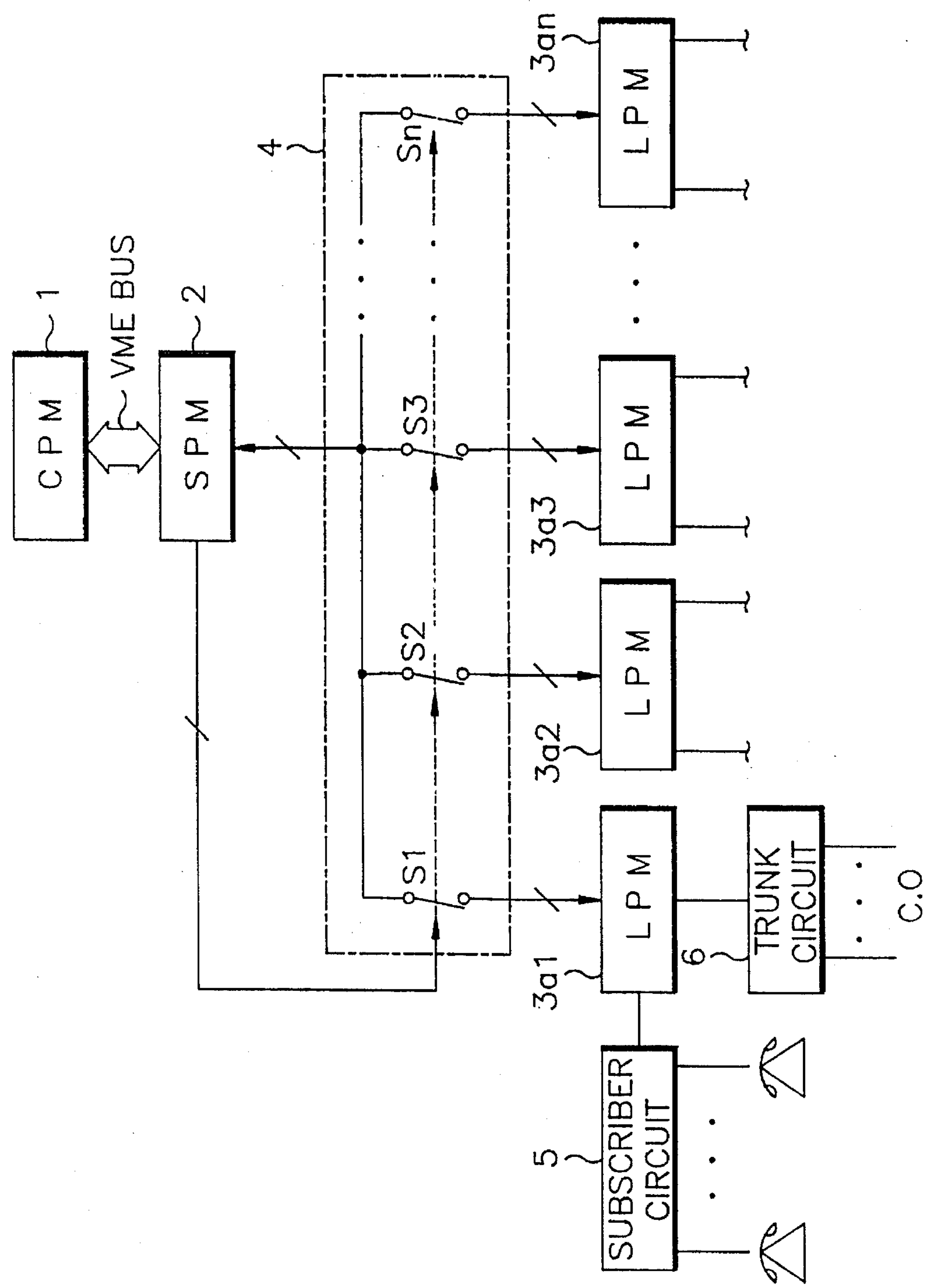
FIG. 1 is a schematic diagram of a decentralized node exchange system applied to the present invention.

Referring to FIG. 1, there is shown a schematic diagram of a decentralized node exchange system applied to the present invention. A central processing module (CPM) 1 is a main processor for controlling a whole call switching of the exchange system and providing various services. A signal processing module (SPM) 2 is a communication processor for processing all signal information generated in the exchange system. Line processing modules (LPMs) 3a1 to 3an detect various signal information generated at a subscriber terminal. Since the large exchange system has many subscribers, and the number of subscribers to be admitted by the LPM is limited due to the capacity of the processor, one exchange system requires a plurality of LPMs and one SPM processes various signals generated in the LPMs. In this construction, the SPM 2 corresponds to the master system and the LPMs 3a1 to 3an correspond to the slave systems. If it is desired to give and take information between a SPM and LPMs, LPMs divide the time of the SPM, so that only one LPM can communicate with the SPM at a time. In order that the SPM 2 communicates with the LPMs 3a1 to 3an by time division, a switch connecting a specific slave system among a plurality of switches S1 to Sn of a communication path selector 4 should be "ON". Therefore, the communication of point-to-multipoint structure alternatively connecting the switches S1 to Sn is demanded.

Figure 2:
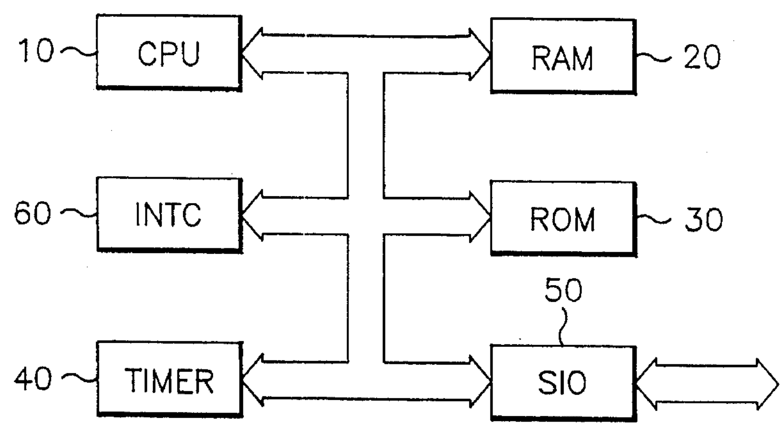
FIG. 2 is a block diagram of a SPM and a LPM shown in FIG. 1.

Referring to FIG. 2, a central processing unit (CPU) 10 processes various signals and controls a system. A random access memory (RAM) 20 temporarily stores communication data and processing data, and a read-only memory (ROM) 30 stores various programs and initial service data. A timer 40 performs the timer interrupt of the CPU 10, and a serial input/output interface (SIO) 50 performs the communication of serial data. An interrupt controller (INTC) 60 implements interrupt services generated in the SIO 50. The above construction shows each of the SPM 2 and the LPMs 3a1 to 3an of FIG. 1 for communicating between point-to-multipoint in a decentralized multinode exchange system.

Figure 3:
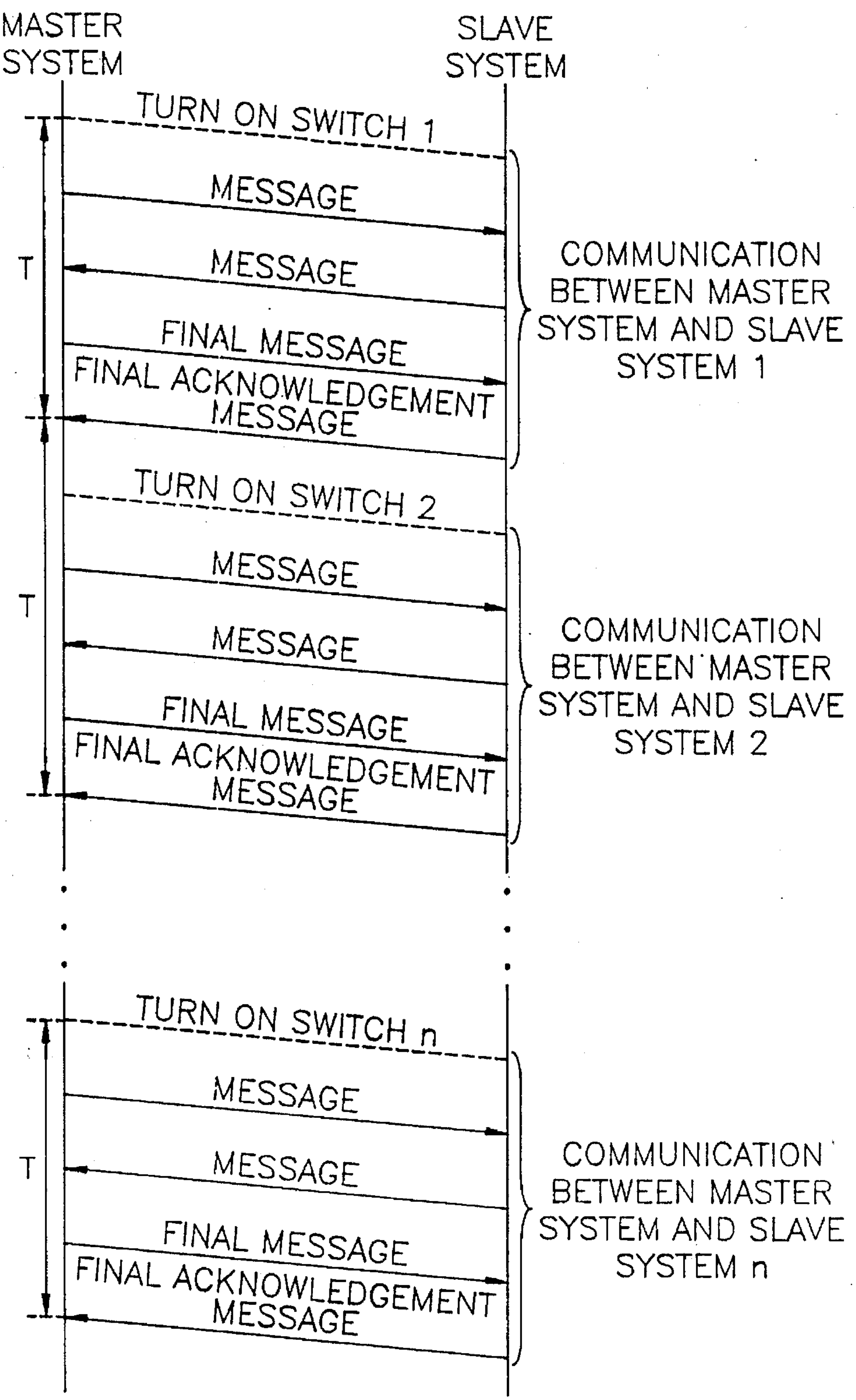
FIG. 3 is a diagram showing a procedure for performing a communication function between a master system and multiple slave systems.

FIG. 3 shows a procedure for performing a communicating function between the master system and the multiple slave systems. One master system communicates with each slave system by the unit of a given communication time T.

The processes for transmitting and receiving a message of the master system and the slave system will be described in detail later on. In the following description, it is assumed that the SPM 2 of FIG. 1 having the construction shown in FIG. 2 corresponds to the master system and the plurality of LPMs 3a1 to 3an having the construction shown in FIG. 2 correspond to the slave systems. The data communication between the master system and the multiple slave systems executed by the master system. Therefore, in order to communicate with each slave system, the CPU 10 of the master system turns on a corresponding switch of the communicating path selector 4, so that a communication path is connected. Then, the master system and the slave system mutually exchange a message. If the communication time T assigned to one slave system elapses, the master system sends a final message to the slave system. Moreover, when receiving a final acknowledgement message from the slave system, the master system completes the communication with a corresponding slave system and the communication with the next slave system is performed. In this case, the exchange of the message is carried out by means of the SIO 50. Meanwhile, in order to perform the above-mentioned communication, four processes must be defined: (1)

a process for transmitting a message to the slave system from the master system; (2) a process for receiving a message from the slave system by the master system; (3) a process for transmitting a message to the master system from the slave system; and (4) a process for receiving a message from the master system by the slave system.

Figure 4B:
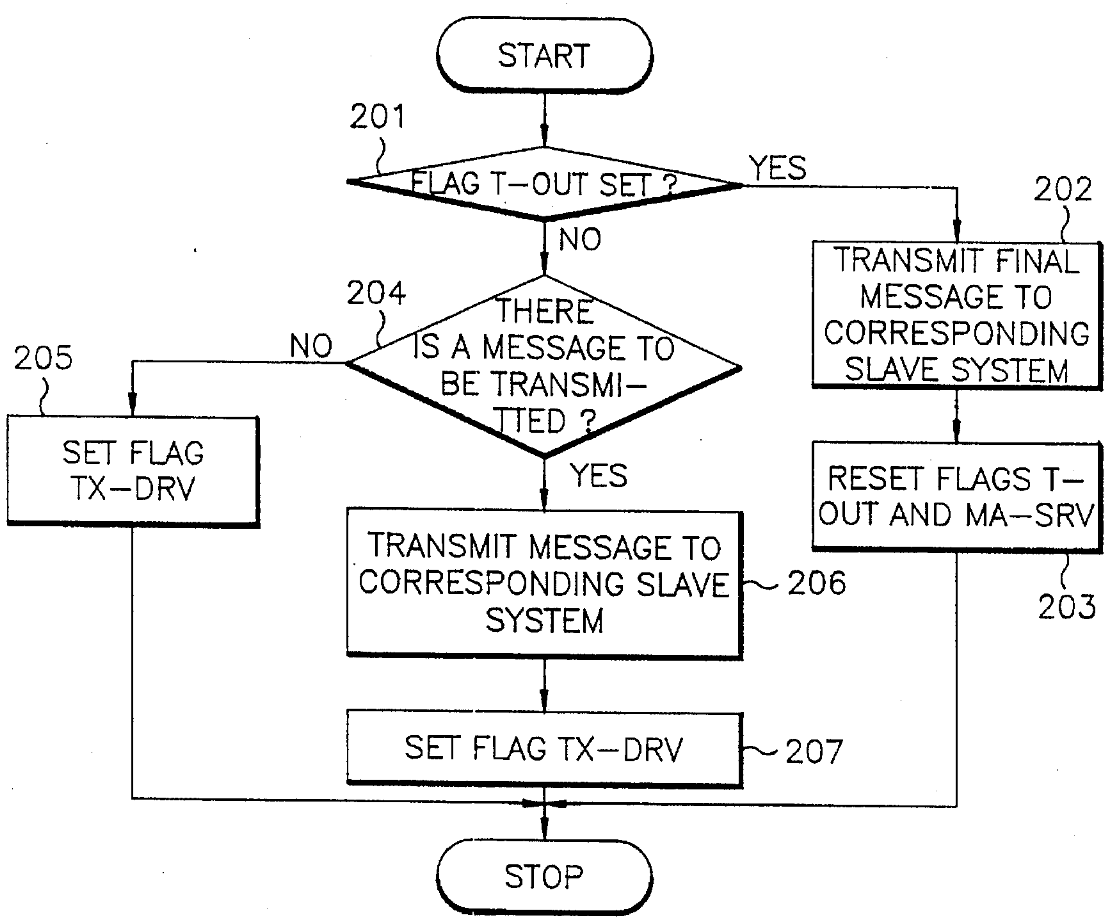
FIGS. 4A to 4D are flow charts showing the steps for transmitting and receiving a message by a master system according to the present invention.
Figure 4A:
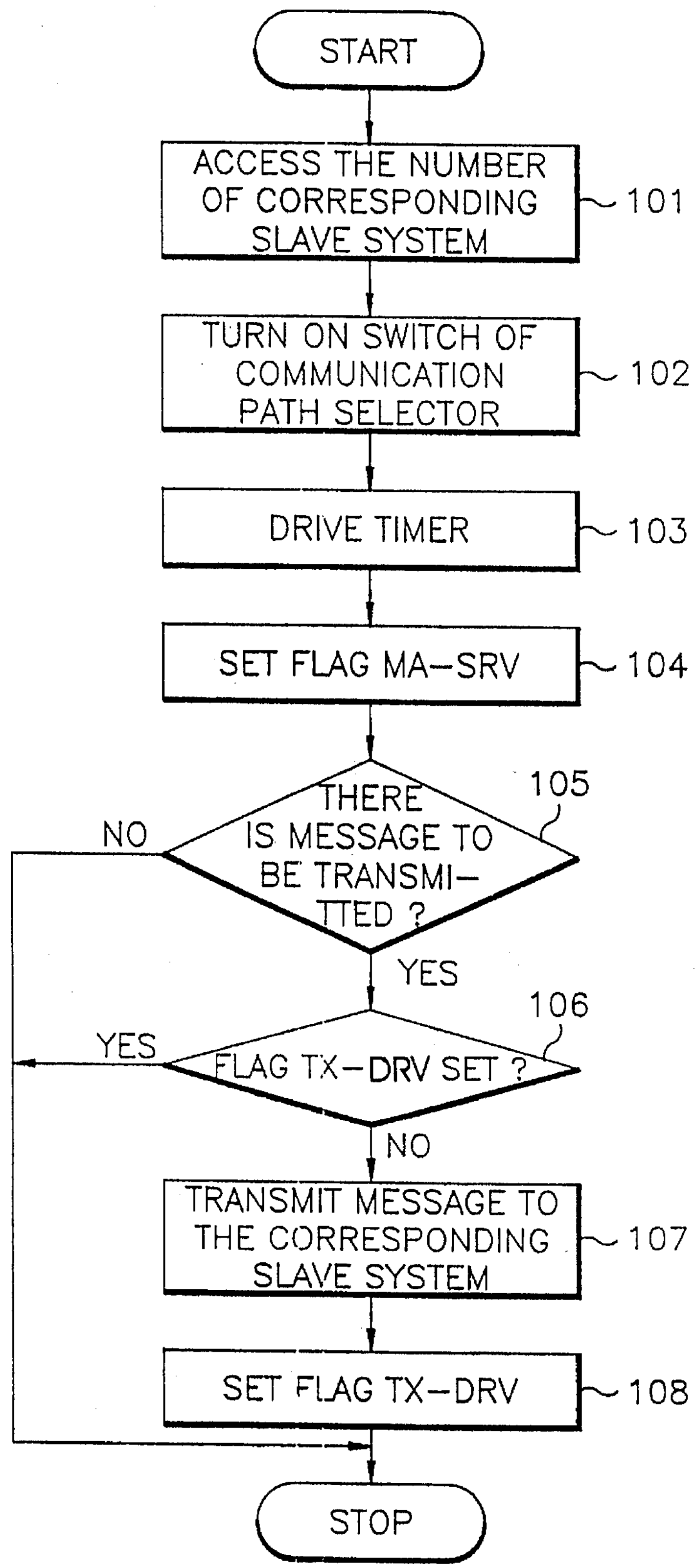

FIG. 4A shows a message transmitting routine for transmitting a message from the master system to each slave system. The master system transmits a message during a given communication time T assigned to each slave system. The CPU 10 of the master system searches for, in step 101, the number N of a corresponding slave system to perform communication by accessing the RAM 20. In following step 102, a switch of the communication path selector 4 is turned on to connect a communication path between the master system and the corresponding slave system. Next, the timer 40 is driven by setting the communication time T for the corresponding slave system in step 103, and a master system service flag MA-SRV is set, in step 104, indicating that the master system is in a communicating state. Thereafter, the CPU 10 determines, in step 105, whether or not there is a message to be transmitted to the corresponding slave system. If the message is not detected, the CPU 10 completes the entire series of the above steps. When the message is detected, step 105 is followed by step 106 where whether or not a transmission drive flag TX-DRV indicating that another message is being transmitted has been set is checked. If the flag TX-DRV has been set, operations are terminated, and otherwise, step 106 proceeds to step 107 to transmit a message to the corresponding slave system. Thereafter, in step 108, the flag TX-DRV is set to drive a transmission start since the transmission occurs by the interrupt.

Figure 4C:
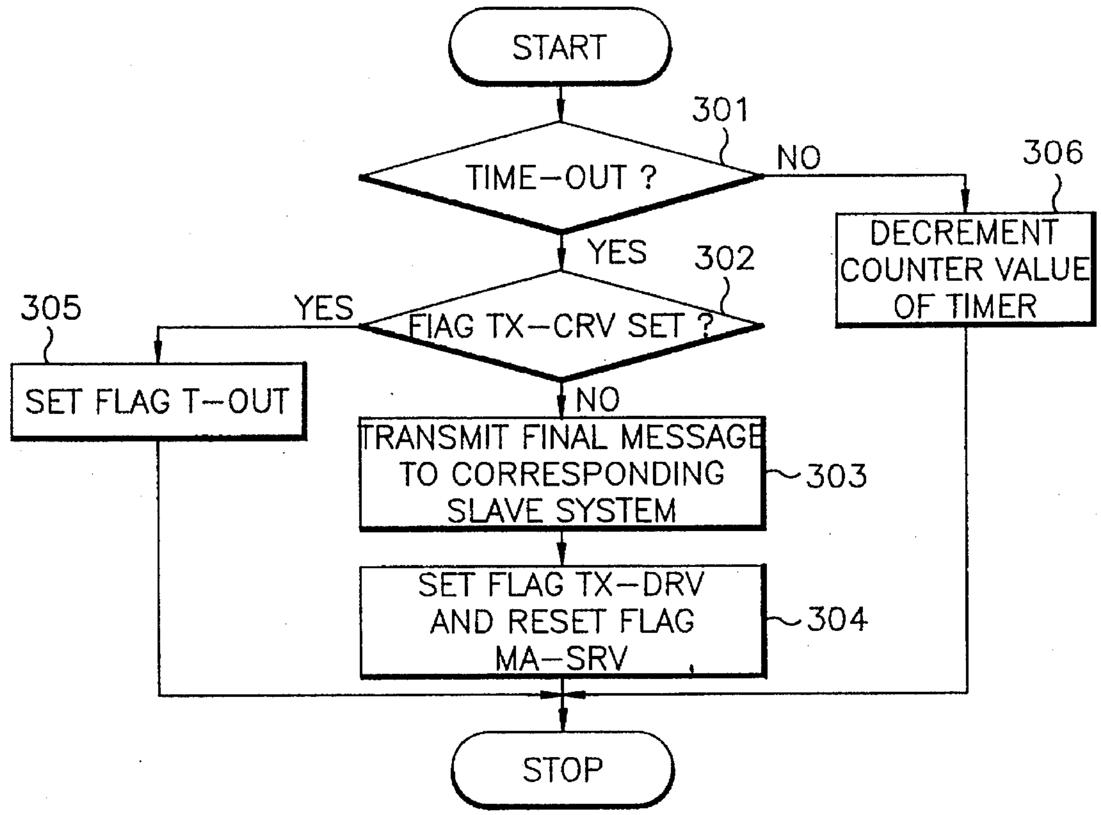

On the other hand, in order to transmit various messages during the communication time T and to perform the service of another slave system after the communication time T, two interrupt routines are required: a message end interrupt routine shown in FIG. 4B and a timer interrupt routine shown in FIG. 4C.

The message end interrupt routine is generated after a message is transmitted to the corresponding slave system. Referring now to FIG. 4B, a determination is made, in step 201, whether or not a time out flag T-OUT has been set to see if the communication time T is over. If the flag T-OUT has been set, step 201 advances to step 202 to transmit a final message to the corresponding slave system. In following step 203, the flags T-OUT and MA-SRV are reset to perform the service of the next slave system. Meanwhile, if the communication time T has not expired, step 201 proceeds to step 204 to see if there is a message to be transmitted to the slave system. If the message to be transmitted is not detected, the flag TX-DRV is reset in step 205. If the message is detected, step 204 is followed by step 206 to transmit a message to the corresponding slave system, and in step 207, the flag TX-DRV is set.

FIG. 4C is a flow chart of a timer interrupt routine when the master system transmits a message to each slave system. The timer interrupt routine performs a message transmission service during a given communication time T assigned to each slave system by the interrupt generated by hardware every a given time predetermined in the timer 40. In step 301, a determination is made whether or not the communication time T elapsed. If the communication time T elapsed, step 301 advances to step 302 where whether or not the flag TX-DRV has been set is checked to see if a message is being transmitted, and if the communication time T has not elapsed, a counter value of the timer is decremented by one in step 306. If the message is being transmitted, step 302 proceeds to step 305 where the flag T-OUT is set since a final message must be transmitted after sending the message being transmitted. In step 302, if the flag TX-DRV has been not set, that is, the message is not being transmitted, a final message is transmitted to the corresponding slave system in step 303. Next, in step 304, the flag TX-DRV is set and the flag MA-SRV is reset.

Figure 4D:
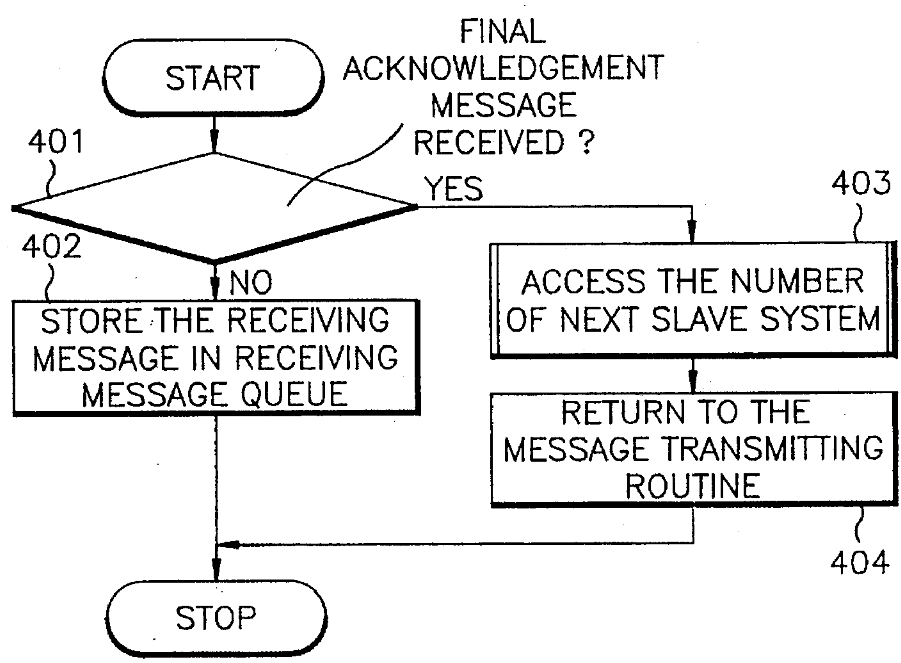

Through the routine of FIG. 4D, the master system receives a message from the slave system. A determination is made, in step 401, whether or not a receiving message is a final acknowledgement message. If the receiving message is a normal message, the receiving message is stored, in step 402, in a receiving message queue of the RAM 20. If the receiving message is a final acknowledgement message, step 401 advances to step 403 to obtain the number of the next slave system by incrementing the number of the current slave system by one. Step 403 is followed by step 404 to return to the message transmitting routine of FIG. 4A. At this time, it is assumed that in the case of the reception of a message, the slave system has been always connected.

Figure 5A:
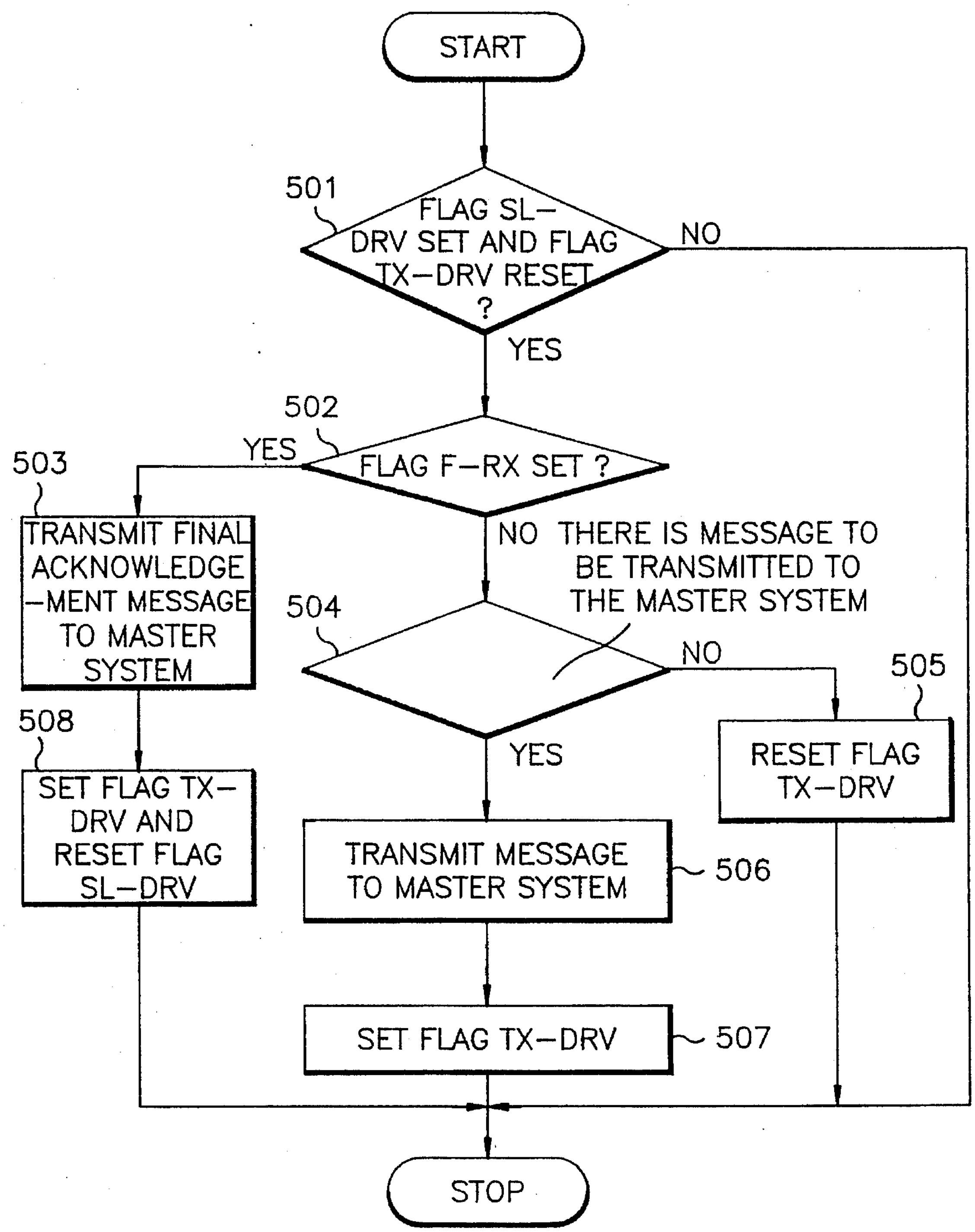
FIGS. 5A to 5C are flow charts showing the steps for transmitting and receiving a message by a slave system according to the present invention.

FIG. 5A is a flow chart showing processes for transmitting a message to the master system from the slave system. In step 501, a check is made whether or not a slave system drive flag SL-DRV indicating that the slave system is in a communicating state has been set and the flag TX-DRV has been reset. If the flag SL-DRV has been not set and the flag TX-DRV has been not reset, operations are terminated, and otherwise, step 501 proceeds to step 502 to check whether or not a final message reception flag F-RX indicating the reception of a final message has been set. If the flag F-RX has been set, a final acknowledgement message is transmitted to the master system in step 503. Thereafter, in step 508, the flag TX-DRV is set and the flag SL-DRV is reset. If the flag F-RX has been not set, that is, the final message has been not received, step 502 advances to step 504 where whether or not there is a message to be transmitted to the master system is determined, If the message to be transmitted is not detected, the flag TX-DRV is reset in step 505, and the message to be transmitted presents, the message is transmitted to the master system in step 506. Next, in step 507, the flag TX-DRV is set. In the above steps, the flag SL-DRV is set by the interrupt, to be described hereinafter, generated when a corresponding switch of the communication path selector 4 is "ON".

Figure 5B:
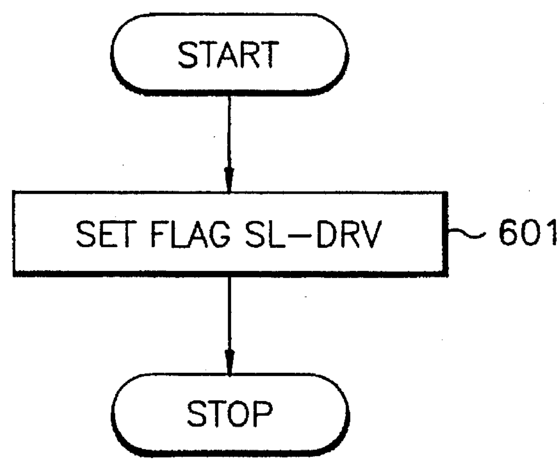

An interrupt routine performed when the slave system connects a communication path to the master system is shown in FIG. 5B. The interrupt is generated when a switch among the switches S1 to Sn of the communication path selector 4 is "ON" by the control of the master system. When generating the interrupt, in step 601, the SL-DRV flag is set.

Figure 5C:
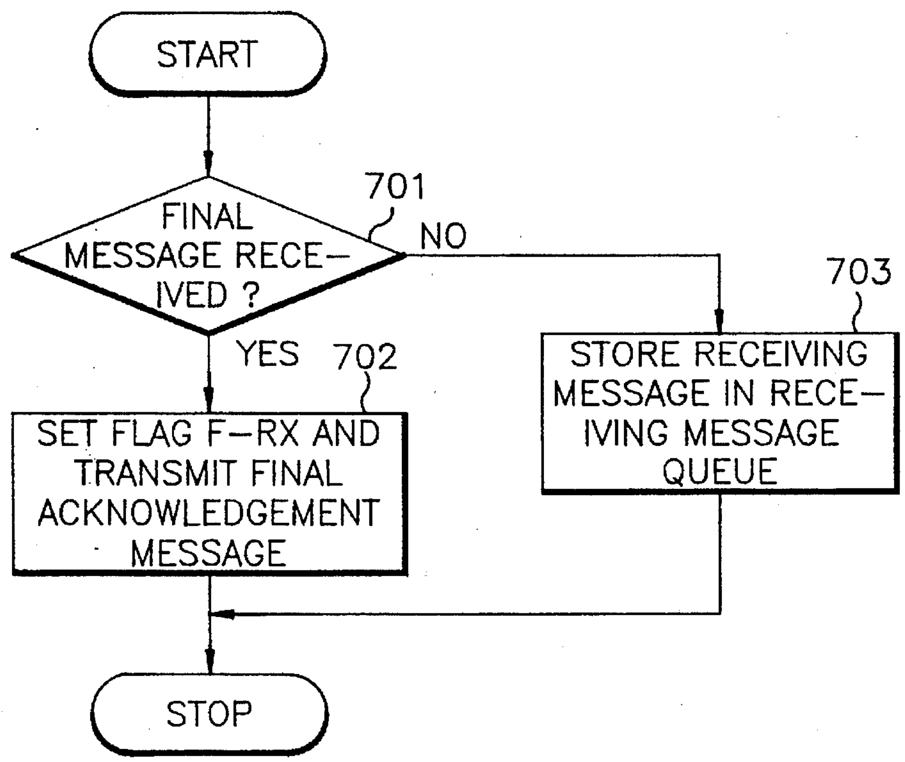

FIG. 5C is a flow chart showing a process for receiving a message from the master system. In step 701, whether or not a receiving message is a final message indicating that the end of a communication service from the master system to the corresponding slave system is checked. If it is a final message, the flag F-RX is set so as to transmit the final acknowledgement message to the transmitting routine of FIG. 5A. If the receiving message is not a final message, the receiving message is stored in the receiving message queue in step 703.

Consequently, a data communication of point-to-multipoint structure by the use of the SIO interface between a master system and multiple slave systems can be achieved. Meanwhile, the transmission and reception of a message is performed with high level data link control (HDLC) frame format.

As described above, since an effective communication between point-to-multipoint is possible, messages are transmitted and received through these hardware of a simple construction, and a large quantity of signal messages can be processed.

While preferred embodiments of the present invention have been particularly shown and described, it will be understood by those skilled in the art that foregoing and other changes in form and details may be made without departing from the spirit and scope of the present invention.

What is claimed is:

1. A data communication method in a decentralized node exchange system for enabling communication between a master system having a serial input/output interface operable in a time division mode and multiple slave systems connected to a communication path selector comprising a plurality of switches, said method comprising:

a master system communicating process for connecting a communication path between the master system and a first slave system by switching to a first switch of said communication path selector, assigning a communication time for communication between said master system and said first slave system, transmitting messages to said first slave system and simultaneously receiving a message from said first slave system via said serial input/output interface, when said communication time has elapsed transmitting a final message to said first slave system via said serial input/output interface after transmission of said messages, and executing service for a next slave system for communication between said master system and said next slave system by switching to a second and successive switch of said communication path selector when a final acknowledgment message is received from said first slave system; and a slave system communicating process of said first slave system for receiving messages transmitted by said communication path of said master system communicating process upon switching to said first switch of said communication path selector and simultaneously transmitting a message to said master system via said serial input/output interface, and transmitting the final acknowledgment message to said master system via said serial input/output interface when the final message is received from said master system.

2. The method as claimed in claim 1, wherein said master system communicating process comprises:

a message transmitting process for connecting said communication path between the master system and said first slave system, driving a timer and transmitting a message via said serial input/output interface;

a message end interrupt process for checking whether said communication time for said first slave system connected by the communication path has elapsed whenever the transmission of a message ends, transmitting said final message via said serial input/output interface when said communication time has elapsed, and transmitting another message via said serial input/output interface when said communication time has not elapsed; and a message receiving process for checking whether a message received from said first slave system connected by said communication path is a final acknowledgement message, storing the received message in a receiving message queue when said received message is not the final acknowledgement message, obtaining a number of the next slave system and returning to said message transmitting process when said received message is the final acknowledgement message.

3. The method as claimed in claim 2, further comprising:

a timer interrupt process for checking whether the communication time between said master system and said first slave system has elapsed by checking a counter value of the timer whenever the driving of the timer of said message transmission process is terminated, transmitting said final message via said serial input/output interface when the communication time has elapsed, and decrementing the counter value of the timer by a given value when the communication time has not elapsed.

4. The method as claimed in claim 1, wherein said slave system communicating process comprises:

a service interrupt process for indicating that said master system a provides service by interruption of said serial input/output interface when the communication path of said master system communicating process is connected upon switching to said first switch of said communication path selector;

a message transmitting process for checking whether said final message has been received, transmitting said final acknowledgement message via said serial input/output interface when said final message is detected, and transmitting a message via said serial input/output interface when said final message is not detected; and a message receiving process for checking whether a message received from said master system is said final message, storing the received message in a receiving message queue when said received message is not said final message, and transmitting said final acknowledgement message when said received message is said final message.

5. A data communication method for enabling communication between a master system and multiple slave systems in a decentralized node exchange system via a communication path selector in a time division mode, said method comprising:

a message transmitting process for establishing a communication path accommodating transmission of messages between the master system and a corresponding slave system, assigning a communication time for communication of said messages between said master system and said corresponding slave system and when said communication time has elapsed transmitting a final message to the corresponding slave system via a serial input/output interface; and a message receiving process for checking whether a message received from said corresponding slave system connected by said communication path is a final acknowledgment message, storing the received message in a receiving message queue when said received message is not said final acknowledgment message, obtaining a number of the next slave system and returning to said message transmitting process to establish a second communication path accommodating transmission of messages between said master system and a next slave system when said received message is said final acknowledgment message.

6. The method as claimed in claim 5, further comprising:

a message end interrupt process for checking whether the communication time for said first slave system connected by the communication path has elapsed whenever the transmission of a message ends, transmitting said final message to said first slave system via said serial input/output interface when said communication time has elapsed, and transmitting another message via said serial input/output interface when said communication time has not elapsed; and a timer interrupt process for checking whether the communication time has elapsed by checking a counter value of the timer whenever the driving of the timer of said message transmission process is terminated, transmitting said final message via said serial input/output interface when the communication time has elapsed, and decrementing the counter value of the timer by a given value when the communication time has not elapsed.

7. A data communication method between a signal processing module and successive one of a plurality of line processing modules connected to respective subscriber terminals via a communication path selector in a decentralized multi-node exchange system having a central processing module for controlling said decentralized multi-node exchange system, said signal processing module comprising a central processor for controlling operation of said signal processing module, a random-access memory for temporarily storing communication data and processing data, a read-only memory for storing application programs, a timer for performing a timer interrupt of said central processor, a serial input/output interface for enabling communication of serial data and messages between said signal processing module and a selected one of said plurality of line processing modules, and an interrupt controller for controlling said serial input/output interface, said data communication method comprising the steps:

establishing a communication path between the signal processing module and a selected one of said plurality of line processing modules via said communication path selector;

assigning a communication time for communication between said signal processing module and said selected one of said plurality of line processing modules;

transmitting an initial message from said signal processing module to said selected one of said plurality of line processing modules via said serial input/output interface, and simultaneously receiving a return message from said selected one of said plurality of line processing modules via said serial input/output interface;

when said communication time has elapsed, transmitting a final message from said signal processing module to said selected one of said selected one of said plurality of line processing modules via said serial input/output interface, after said initial message has been transmitted; and executing service for a second one of said plurality of line processing modules upon establishing a second communication path between the signal processing module and the second one of said plurality of line processing modules, when a final acknowledgment message is received from said selected one of said plurality of line processing modules via said serial input/output interface.

8. The data communication method as claimed in claim 7, further comprising the steps of:

checking whether the communication time for communication between said signal processing module and said selected one of said plurality of line processing modules has elapsed, after said initial message has been transmitted from said signal processing module;

transmitting said final message from said signal processing module to said selected one of said plurality of line processing modules via said serial input/output interface, when said communication time has elapsed;

transmitting another message from said signal processing module to said selected one of said plurality of line processing modules via said serial input/output interface, when said communication time has not elapsed;

checking whether the return message received from said selected one of said plurality of line processing modules is the final acknowledgement message; and storing the received return message in a receiving message queue of said random-access memory when said received return message is not the final acknowledgement message.

9. The data communication method as claimed in claim 7, wherein said communication time is checked for elapse by checking a counter value of said timer in said signal processing module so as to transmit the final message to said selected one of said plurality of line processing modules via said serial input/output interface.

10. The data communication method as claimed in claim 7, further comprising:

indicating whether said signal processing module provides a service by the interrupt of the serial input/output interface through said interrupt controller;

checking whether the final message has been received by said selected one of said plurality of line processing modules;

transmitting the final acknowledgement message from said selected one of said plurality of line processing modules to said signal processing module via said serial input/output interface when the final message is detected;

transmitting another message from said selected one of said plurality of line processing modules via said serial input/output interface when the final message is not detected; and checking whether a message received from said signal processing module is the final message, storing the received message in a receiving message queue of said random-access memory when said received message is not the final message, and transmitting a final acknowledgement message when said received message is the final message.

11. The data communication method as claimed in claim 10, wherein said communication time is checked for elapse by checking a counter value of said timer in said signal processing module in order to transmit the final message to said selected one of said plurality of line processing modules via said serial input/output interface.

12. A data communication method between a signal processing module and successive ones of a plurality of line processing modules connected to respective subscriber terminals via a communication path selector in a decentralized multi-node exchange system having a central processing module for controlling said decentralized multi-node exchange system, said signal processing module comprising a central processor for controlling operation of said signal processing module, a random-access memory for temporarily storing communication data and processing data, a read-only memory for storing various programs, a timer for performing a timer interrupt of said central processor, a serial input/output interface for enabling communication of serial data between said signal processing module and a selected one of said plurality of line processing modules, and an interrupt controller for controlling said serial input/output interface, said data communication method comprising:

a first communication process for connecting a communication path between the signal processing module and a corresponding line processing module via said serial input/output interface, assigning a communication time for communication between the signal processing module and the corresponding line processing module via said serial input/output interface, transmitting initial messages to the corresponding line processing module and simultaneously receiving a return message from said line processing module, when said communication time has elapsed transmitting a final message to the corresponding line processing module after the initial message has been transmitted, and executing service for the next line processing module when a final acknowledgment message is received from the corresponding line processing module; and a second communication process for receiving messages transmitted by said signal processing module via the communication path and simultaneously transmitting the return message to said signal processing module, and transmitting the final acknowledgment message to said signal processing module when the final message is received from said signal processing module.

13. The data communication method as claimed in claim 12, wherein said first communication process comprises the steps of:

establishing said communication path between the signal processing module and the corresponding line processing module via said communication path selector;

driving said timer for monitoring the communication time and transmitting the initial message from the signal processing module to the corresponding line processing module via said serial input/output interface;

checking whether the communication time for communication between the signal processing module and the corresponding line processing module has elapsed, after the initial message has been transmitted, transmitting the final message via said serial input/output interface when said communication time has elapsed, and transmitting another message via said serial input/output interface when said communication time has not elapsed; and checking whether a message received from the corresponding line processing module is the final acknowledgement message, storing the received message in a receiving message queue of said random-access memory when said received message is not the final acknowledgement message, establishing communication with the next line processing module when said received message is the final acknowledgement message.

14. The data communication method as claimed in claim 13, further comprising the step of checking whether the communication time has elapsed upon a determination of a counter value of the timer in said signal processing module so as to transmit the final message to the corresponding line processing module via said serial input/output interface.

15. The data communication method as claimed in claim 12, wherein said second communication process comprises:

indicating whether said signal processing module provides a service by the interrupt of the serial input/output interface through said interrupt controller;

checking whether the final message has been received by the corresponding line processing module;

transmitting the final acknowledgement message from the corresponding line processing module to said signal processing module via said serial input/output interface when the final message is detected;

transmitting another message from the corresponding line processing module via said serial input/output interface when the final message is not detected; and checking whether a message received from said signal processing module is the final message, storing the received message in a receiving message queue of said random-access memory when said received message is not the final message, and transmitting a final acknowledgement message when said received message is the final message.

16. A decentralized node exchange system of a telephone network comprising a plurality of subscriber terminals, said decentralized node exchange system comprising:

a central processing module for controlling call switching in said decentralized node exchange system;

a plurality of line processing modules connected to said plurality of subscriber terminals, for detecting communication data generated from said subscriber terminals;

a communication path selector comprising a plurality of switches operably connected to corresponding ones of said plurality of line processing modules, for establishing communication path with said line processing modules;

a signal processing module comprising a central processor for processing communication data generated in said decentralized node exchange system, a random-access memory for temporarily storing communication data, a read-only memory for storing application programs, a timer for performing a timer interrupt of said central processor, a serial input/output interface for enabling serial communication between said signal processing module and a selected one of said plurality of line processing modules, and an interrupt controller for controlling said serial input/output interface, said signal processing module establishing communication with said plurality of line processing modules by:

forming a communication path with a first line processing module from said plurality of line processing modules by switching to a first switch of said communication path selector;

assigning a communication time for communication between said signal processing module: and said first line processing module;

transmitting initial messages from said signal processing module to said selected one of said plurality of line processing modules via said serial input/output interface, and simultaneously receiving a return message from said first line processing module via said serial input/output interface;

after said initial messages have been transmitted and when said communication time has elapsed transmitting a final message from said signal processing module to said first line processing module via said serial input/output interface; and executing service for a second and next line processing module by switching to a second switch of said communication path selector when a final acknowledgment message is received from said first line processing module via said serial input/output interface.

17. The decentralized node exchange system as claimed in claim 16, wherein said signal processing module further communicates with said first line processing module by:

checking whether the communication time for communication with said first line processing module has elapsed, after said initial message has been transmitted from said signal processing module;

transmitting said final message to said first line processing module via said serial input/output interface, when said communication time has elapsed;

transmitting additional messages to said first line processing module via said serial input/output interface, when said communication time has not elapsed;

checking whether the return message received from said first line processing module is the final acknowledgement message; and storing the received return message in a receiving message queue of said random-access memory when said received return message is not the final acknowledgement message.

18. The decentralized node exchange system as claimed in claim 16, wherein said first line processing module further communicates with said signal processing module by:

indicating whether a service is provided from said signal processing module by the interrupt of the serial input/output interface through said interrupt controller;

checking whether the final message has been received;

transmitting the final acknowledgement message to said signal processing module via said serial input/output interface when the final message is detected;

transmitting additional messages to said signal processing module via said serial input/output interface when the final message is not detected; and checking whether a message received from said signal processing module is the final message, storing the received message in a receiving message queue of said random-access memory when said received message is not the final message, and transmitting a final acknowledgement message when said received message is the final message.

19. The decentralized node exchange system as claimed in claim 16, wherein said communication time is checked for elapse by checking a counter value of said timer in said signal processing module so as to transmit the final message to said selected one of said plurality of line processing modules via said serial input/output interface.

20. The decentralized node exchange system of claim 17, wherein said first line processing module further communicates with said signal processing module by:

indicating whether a service is provided from said signal processing module by the interrupt of the serial input/output interface through said interrupt controller;

checking whether the final message has been received;

transmitting the final acknowledgement message to said signal processing module via said serial input/output interface when the final message is detected;

transmitting additional messages to said signal processing module via said serial input/output interface when the final message is not detected; and checking whether a message received from said signal processing module is the final message, storing the received message in a receiving message queue of said random-access memory when said received message is not the final message, and transmitting a final acknowledgement message when said received message is the final message.

* * * * *